July 28, 1925.
A. E. BURSON
WATER PURIFIER AND COOLER
Filed April 23, 1921
1,547,855
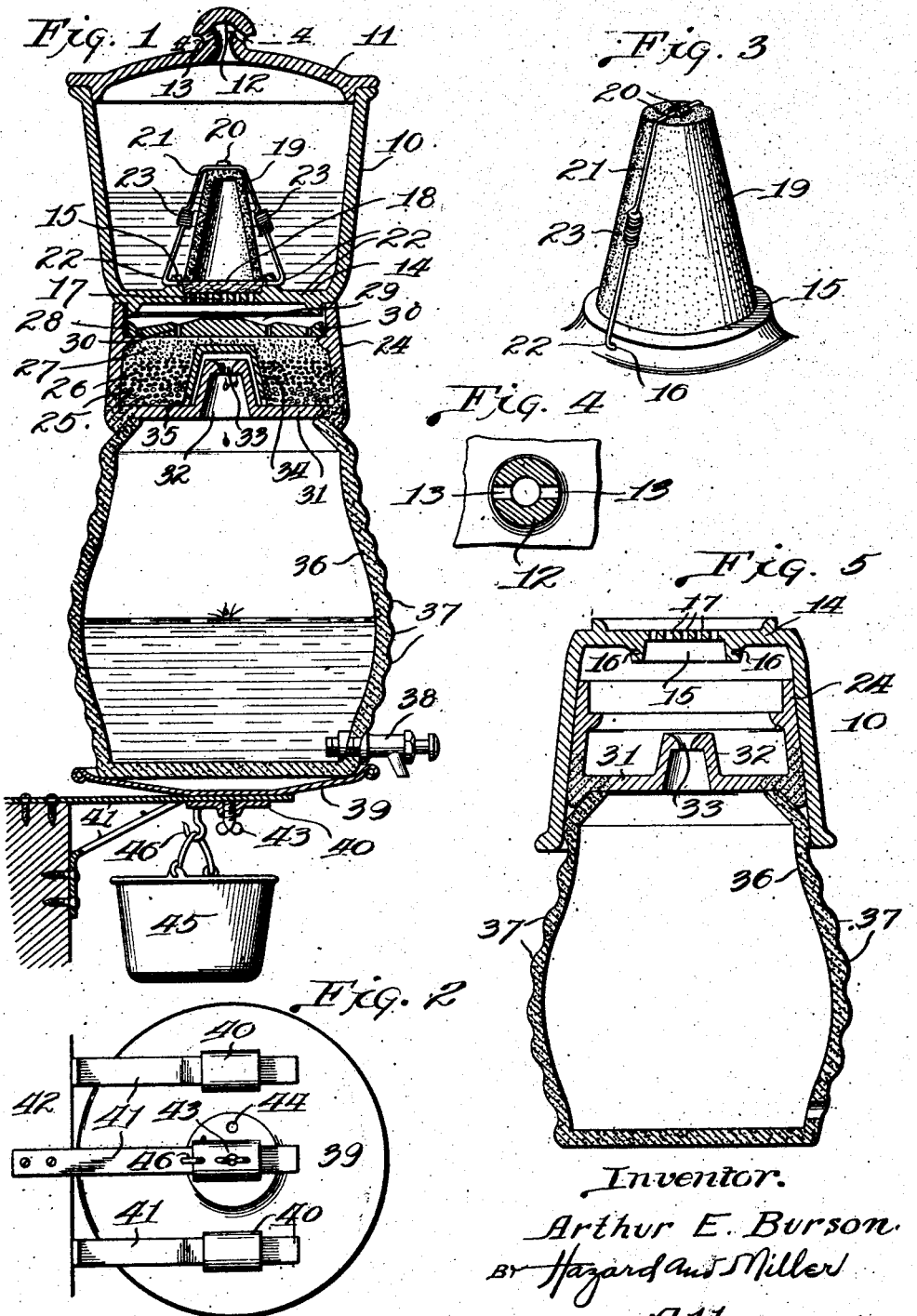
Inventor.
Arthur E. Burson.
By Hazard and Miller
Attorneys.

Patented July 28, 1925.

1,547,855

UNITED STATES PATENT OFFICE.

ARTHUR E. BURSON, OF LONG BEACH, CALIFORNIA, ASSIGNOR TO G. J. WIGGENHORN, OF LOS ANGELES, CALIFORNIA.

WATER PURIFIER AND COOLER.

Application filed April 23, 1921. Serial No. 463,775.

*To all whom it may concern:*

Be it known that I, ARTHUR E. BURSON, a citizen of the United States, residing at Long Beach, in the county of Los Angeles and State of California, have invented new and useful Improvements in Water Purifiers and Coolers, of which the following is a specification.

My invention relates generally to water filters and coolers and more particularly, to that class of filters that are utilized for domestic and household purposes and which filter by gravity; the principal objects of my invention being, to generally improve upon and simplify the construction of the existing forms of filters of the type to which my invention relates, and, further, to provide a relatively simple portable or domestic water filter having parts that may be readily assembled or taken apart to facilitate cleansing, and further, to provide a structure having a filtered water container that is similar in construction and operation to the well-known olla that is in general use in the warmer climates and which is very effective in keeping the water in cool condition.

Further objects of my invention are to provide relatively simple means for effecting an initial filtration of the water that is delivered to the combined filter and cooler and which initial filtering means is effective in removing from the water the relatively coarse material such as silt and consequently preparing the water for passage through the final filtering and purifying media and preventing the accumulation of rough material, such as silt, in the latter; to provide for ventilation in the chamber that receives the water to be filtered, thereby permitting the ready escape of any odors and gases that may arise from the unfiltered water; to construct the main parts of the filter so that the same may be nested when packed for storage or transportation, thereby minimizing transportation charges; to provide the filtered water container with a relatively large area of external surface, thereby materially increasing the cooling effectiveness of said container; and, further, to provide an improved support for the combined filter and cooler.

With the foregoing and other objects in view, my invention consists in certain novel features of construction and arrangement of parts that will be hereinafter more fully described and claimed, and illustrated in the accompanying drawings, in which:

Fig. 1 is a vertical section taken through the center of a combined water filter and cooler of my improved construction.

Fig. 2 is a plan view looking against the underside of the support for the combined filter and cooler.

Fig. 3 is a perspective view of the initial filtering member that is removably positioned in the filtered water container.

Fig. 4 is an enlarged cross section taken approximately on the line 4—4 of Fig. 1.

Fig. 5 is a vertical section showing the principal members of my improved filter in nesting arrangement, or as said parts are packed for storage or transportation.

Referring by numerals to the accompanying drawings, which illustrate a practical embodiment of my invention: 10 designates the receptacle or container for the water to be filtered, said receptacle being formed of suitable material such as glazed earthenware, and the annular wall of said receptacle tapers gradually toward its lower end. A cover 11 is provided for the top of the receptacle 10, and formed at the center of said cover is a hollow knob or handle 12 and formed through the neck of the latter is a pair of oppositely disposed apertures 13, thereby affording ventilation for the chamber within the filtered water container and permitting the ready escape of any odors or gases that may arise from the unfiltered water.

Formed on top of the bottom 14 of the receptacle 10 is a concentrically arranged annular flange 15, and formed therein at diametrically opposite points, are horizontally disposed apertures 16. The body of the bottom 14 within this annular flange 15 is perforated as designated by 17 and positioned on top of said perforated bottom portion and within the flange 15, is a disc 18 of filtering material, such as asbestos or analogous material.

The initial filtering member contemplated by my invention consists of a hollow, truncated conical member 19, open at its lower end, and the lower edge of the wall of said member rests directly on top of the filtering disc 18 and occupies a position immediately inside the top of flange 15. This member 19 is preferably formed of porous earthen material and formed on its top, is a pair of spaced lugs 20. The initial filtering member is retained in position within the receptacle 10 by means of a guard 21, preferably formed of wire that is bent into inverted U-shape so that it will extend over the filtering member 19, and the lower ends of the legs of said inverted U-shaped guard or retaining member, are bent inwardly as designated by 22 so as to engage in the apertures 16 in flange 15.

Portions of the legs of the inverted U-shaped guard 21 are bent to form coiled springs 23 and which latter are slightly expanded when the bent ends of the legs are engaged in the recesses 16 and the straight central portion of the guard overlies the flat top of filtering member 19 and is received between the lugs 20; (see Fig. 3). Thus, the initial filtering member 19 is firmly retained in position in the center of receptacle 10 and when desired, the retaining member or guard 21 can be easily and quickly detached, thereby permitting the member 19 to be removed and cleansed.

The bottom of receptacle 10 rests directly on top of the annular wall 24 of the receptacle that contains the final filtering and purifying media and which latter comprises, a layer 25 of pulverized or disintegrated material such as granite, the same being positioned in the bottom of receptacle 24, a layer 26 of material such as granulated charcoal, the same lying on top of the bed or layer of crushed granite, and a layer or bed 27 of pulverized bone carbon, the same lying on top of the bed of charcoal.

Arranged in the upper portion of receptacle 24, and above the layers or beds of filtering and purifying material, is a distributing plate or disc 28, preferably of glazed earthen material and the top surface of which slopes gradually downward from the center toward its edge or periphery. Formed in the sloping top of this distributing plate are radially disposed grooves or channels 29 and formed in the lower end of each of said grooves or channels, is an aperture 30 which permits water to pass through the distributing plate, and these apertures are located so that the water will be distributed uniformly over the top of the filtering and purifying bed that occupies the receptacle below said distributing plate.

Formed in the center of the bed 31 over receptacle 24, is a truncated conical member 32, in the top of which is formed an aperture 33, and positioned directly over this member 32, is an inverted cup-shaped member 34, the bottom of the annular wall of which rests directly upon the bottom 31 of receptacle 24, and, formed in the lower edge of said annular wall, is a series of notches 35 which permit filtered and purified water to pass from the lower portion of the filtering and purifying bed, upwardly through the annular space between the members 32 and 34 and said water finally discharging downwardly through the aperture 33 in the top of said member 32.

By virtue of the construction just described, all of the water that passes downwardly through the apertures in distributing plate 28, is caused to pass entirely through the combined filtering and purifying bed before it can discharge into the filtered water container.

The lower portion of the annular wall of receptacle 24 and the outer portion of the bottom 31 are sufficiently porous to permit a relatively small amount of water to percolate therethrough, and thus the upper portion of the wall of the filtered water receptacle 36 is maintained in a moist condition.

This receptacle 36 is formed of porous unglazed material and the wall thereof is provided on its outer face with circumferentially disposed ribs or corrugations 37, thereby materially increasing the area of the outer surface of the receptacle and correspondingly increasing the cooling effectiveness upon the contained filtered water, by reason of the relatively rapid evaporation of the moisture upon the outer surface of the receptacle.

This cooling effect, resulting from rapid evaporation on the external face of the container, will be found in the water containers known as ollas and which are generally used in the warmer climates; but, insofar as I am aware, I am the first to corrugate or rib the external surface of a water container in order to materially increase the area of the surface upon which evaporation takes place.

The annular wall of the receptacle 24 tapers gradually toward its upper end and its diameter is such that it will fit snugly within the receptacle 10 when the latter is inverted as shown in Fig. 5.

This construction permits the main parts of the filter to be nested when packed for storage or transportation, and thus a material saving of freight and transportation charges is effected.

The bottom of receptacle 24 rests directly on top of the filtered water receptacle 36 and, in order that the parts may be firmly held in assembled position when nested as illustrated in Fig. 5, the diameter of the upper portion of receptacle 36 is such that it will enter the lower end of the chamber within receptacle 10 when the latter is inverted and placed over the receptacle 24 and the upper end of said receptacle 36.

Arranged in the lower portion of the wall of the filtered water receptacle is a suitable faucet or outlet valve 38.

The supporting bracket or holder for my improved water filter and cooler includes a shallow plate 39, on the underside of which is located a series of straps or loops 40 and in which latter are positioned the outer ends of brackets such as 41 that are secured to a suitable base or supporting member 42. The supporting plate 39 may be moved lengthwise upon the brackets 41 and retained in its adjusted position by means of a set screw 43 that passes through one of the loops or straps.

Formed in the plate 39, near the center thereof, is an aperture 44 that serves as an outlet for any water that may flow downwardly over the surface of the filtered water container 36, and, to catch this overflow, a suitable receptacle such as 45 is suspended from a suitably located hook or bracket 46, beneath the central portion of the plate 39.

In the operation of my improved water filter and purifier, the water to be filtered and used is delivered into receptacle 10 and in due time, this water will by gravity, pass through the initial filtering media 19 and which latter is effective in separating from said water, the coarser foreign matter such as silt and the like; and the water, devoid of this relatively coarse, foreign matter, will pass through filtering element 18 and discharge on to distributing plate 28, and, after passing thereover, will discharge through apertures 30 directly on to the top of the filtering and purifying bed within container 24.

In passing through this filtering bed, the water will be very thoroughly filtered and purified and in such condition, will pass through the notches 35 and the lower end of member 34 and thence upwardly through the annular space between members 32 and 34 and from thence, said filtered and purified water will discharge through aperture 33 into the chamber within receptacle 36; and from whence the filtered and purified water may be withdrawn as desired, by proper manipulation of faucet 38.

As previously stated, a certain amount of water will percolate through the porous and unglazed lower portion of the wall of receptacle 24, and this water will pass downwardly over the corrugated external surface of receptacle 36, and, after the filter has been in service a short time, and a body of filtered and purified water accumulates within receptacle 36, a portion of this water will percolate through the lower portion of the annular wall of said receptacle and, as a result, the entire outer surface of the last mentioned receptacle will be maintained in moist condition and as evaporation takes place through the entire external surface, the interior of said receptacle and its contents will be maintained in a comparatively cool condition.

The apertures 13 in the hollow knob 12 at the top of the unfiltered water receptacle 10 permits ventilation of the chamber containing the supply of unfiltered water and when it becomes necessary, the initial filtering member 19 may be very readily removed and cleansed, and such action in nowise interferes with the flow of water through the combined filtering and purifying bed within the receptacle 24.

The use of this initial filtering member obviates the necessity for frequent cleansing and renewal of the combined filtering and purifying bed within the receptacle 24 for it will be understood, said initial filtering member is effective in preventing a relatively large amount of silt and like foreign matter from passing onto the combined filtering and purifying bed.

When the main parts of the body of my improved filter are packed for storage or transportation as illustrated in Fig. 5, the smaller parts, such as initial filtering member 19, guard 21, distributing plate 28, member 34 and faucet 38, may be suitably wrapped and packed within the receptacle 36, thereby economizing space.

A combined water filter and cooler of my improved construction is comparatively simple, may be easily and cheaply produced, and may be readily cleansed, and the parts thereof are constructed so that they may be very compactly assembled when packed for storage and transportation.

It will be readily understood that minor changes in the size, form and construction of the various parts of my improved water filter and cooler may be made and substituted for those herein shown and described without departing from the spirit of my invention, the scope of which is set forth in the appended claims.

I claim as my invention:

1. In a water filter, a receptacle adapted to contain water to be filtered, there being a filtered water outlet in the bottom of said receptacle, a truncated conical filtering member positioned within said receptacle over said filtered water outlet, and an inverted U-shaped retaining member positioned over said filtering member and having its ends detachably secured to the bottom of said receptacle.

2. In a water filter, a receptacle adapted to contain water to be filtered, there being a filtered water outlet in the bottom of said receptacle, a truncated conical filtering member positioned within said receptacle over said filtered water outlet, an inverted U-shaped retaining member positioned over said filtering member and having its ends detachably secured to the bottom of said receptacle, and the legs of said retaining member being provided with springs.

3. In a water filter, a receptacle adapted to contain water to be filtered, there being an outlet formed in the bottom of said receptacle, a layer of filtering material positioned over said outlet, a hollow member of filtering material positioned above said layer of filtering material, and a retaining device detachably connected to the bottom of the receptacle and passing over said hollow body of filtering material.

4. In a water filter, a filtered water receptacle, a filtering material container positioned on top of said filtered water receptacle, and a receptacle for the water to be filtered, positioned on top of said container and which last mentioned receptacle, when inverted, is adapted to enclose said filtering material container and the upper portion of the filtered water receptacle.

5. In a combined water filter and cooler, a filtered water receptacle, a filtering material container positioned on top of said receptacle, and a receptacle for the water to be filtered removably positioned on top of the filtering material container, the chamber within which receptacle for water to be filtered being of sufficient size to wholly enclose the filtering material container and the upper portion of the filtered water receptacle when the receptacle for water to be filtered, is inverted.

6. In a combined water filter and cooler, a filtered water receptacle, a filtering material container positioned on said receptacle, the upper portion of said filtered water receptacle and said filtering material container being gradually tapered toward their upper ends, and an unfiltered water receptacle removably positioned on the filtering material container, which inverted water receptacle gradually tapers toward its lower end and the chamber within which inverted water receptacle is adapted to receive the upper portion of the filtered water receptacle and the filtering material container when said unfiltered water receptacle is inverted.

7. In a water filter, a container having its bottom formed with openings, a filtering disk spanning the openings, an annular flange surrounding the disk, a filtering member supported on the disk, and a guard secured to the flange and embracing the filtering member, said guard being provided between its ends with coiled contractile springs.

8. In a water filter, a receptacle adapted to contain water to be filtered, there being a filtered water outlet in the bottom of said receptacle, a truncated conical filtering member positioned within said receptacle over said filtered water outlet, and an inverted retaining member positioned over said filtering member and having its ends detachably secured to the bottom of said receptacle.

In testimony whereof I have signed my name to this specification.

ARTHUR E. BURSON.